(12) United States Patent
Blondin et al.

(10) Patent No.: US 8,765,322 B2
(45) Date of Patent: Jul. 1, 2014

(54) FUEL CELL SUPPORT STRUCTURE AND METHOD OF ASSEMBLY/DISASSEMBLY THEREOF

(75) Inventors: Sean M. Blondin, Manchester, CT (US); Garrett W. Fink, Glastonbury, CT (US); Robert A. Love, Bloomfield, CT (US); Thomas Rock, South Windsor, CT (US)

(73) Assignee: Ballard Power Systems Inc., Burnaby (CA)

( * ) Notice: Subject to any disclaimer, the term of this patent is extended or adjusted under 35 U.S.C. 154(b) by 410 days.

(21) Appl. No.: 13/126,779

(22) PCT Filed: Nov. 5, 2008

(86) PCT No.: PCT/US2008/082385
§ 371 (c)(1),
(2), (4) Date: Apr. 29, 2011

(87) PCT Pub. No.: WO2010/053474
PCT Pub. Date: May 14, 2010

(65) Prior Publication Data
US 2011/0200908 A1   Aug. 18, 2011

(51) Int. Cl.
*H01M 8/24* (2006.01)

(52) U.S. Cl.
USPC .......................................... 429/471; 429/470

(58) Field of Classification Search
None
See application file for complete search history.

(56) References Cited

U.S. PATENT DOCUMENTS

| | | |
|---|---|---|
| 5,403,679 A | 4/1995 | Stone |
| 5,532,072 A | 7/1996 | Spaeh et al. |
| 5,626,984 A | 5/1997 | Albini |
| 5,741,605 A | 4/1998 | Gillett et al. |
| 6,030,718 A | 2/2000 | Fuglevand et al. |
| 6,096,449 A | 8/2000 | Fuglevand et al. |
| 6,110,612 A | 8/2000 | Walsh |
| 6,218,035 B1 | 4/2001 | Fuglevand et al. |
| 6,387,556 B1 | 5/2002 | Fuglevand et al. |
| 6,632,556 B2 | 10/2003 | Guthrie et al. |
| 6,773,839 B2 | 8/2004 | Fuglevand et al. |
| 6,794,069 B1 | 9/2004 | Faris et al. |

(Continued)

FOREIGN PATENT DOCUMENTS

WO   2008049204 A1   5/2008

OTHER PUBLICATIONS

International Preliminary Report on Patentability for International application No. PCT/US2008/082385 mailed May 19, 2011.

(Continued)

*Primary Examiner* — Milton I Cano
*Assistant Examiner* — Carmen Lyles-Irving
(74) *Attorney, Agent, or Firm* — Seed IP Law Group PLLC

(57) ABSTRACT

A fuel cell installation includes a support structure and a cell stack assembly that is removably insertable into the support structure from an uninstalled position to an installed position during an installation procedure. The cell stack assembly includes a fitting. An interfacing structure is mounted on one of the support structure in the cell stack assembly. The interfacing structure carries a connector that is configured to receive the fitting in interconnected relationship. At least one of the fitting and the connector floats in a plane relative to the support structure during the installation procedure. In operation, the fitting engages the connector when the cell stack assembly is inserted into the support structure. The fitting is repositioned relative to the connector to ensure that the fitting and connector are aligned with one another and connected upon installation.

8 Claims, 3 Drawing Sheets

(56) References Cited

U.S. PATENT DOCUMENTS

| | | |
|---|---|---|
| 6,844,100 B2 | 1/2005 | Bourgeois et al. |
| 7,063,912 B2 | 6/2006 | Vuk et al. |
| 7,147,953 B2 | 12/2006 | Haltiner, Jr. et al. |
| RE39,556 E | 4/2007 | Fuglevand et al. |
| 7,323,270 B2 | 1/2008 | Patel et al. |

OTHER PUBLICATIONS

International Search Report and Written Opinion of the International Searching Authority for International application No. PCT/US2008/082385 mailed Jun. 26, 2009.

FUEL CELL SUPPORT STRUCTURE AND METHOD OF ASSEMBLY/DISASSEMBLY THEREOF

BACKGROUND

This disclosure relates to a fuel cell installation in which access to connections may be difficult. More particularly, the disclosure relates to a support structure used in conjunction with removable cell stack assemblies.

One type of proton exchange membrane cell stack assembly includes internal manifolds having opposing end plates secured to one another to load the cell stack assembly components. In one exemplary arrangement, the end plates include electrical fittings and fluid fittings used to supply and return the fuel, reactant and coolant.

In some applications, it is desirable to utilize multiple cell stack assemblies that that can be easily installed and removed relative to a support structure. One such arrangement requires installation of the cell stack assemblies in a direction along its length with one of the end plates inserted into the support structure first. For installations in which there is limited access to the first-installed end plate, the electrical and fluid connections are difficult to achieve. The connections must be made blind with limited space for tools or hands to access, align, and secure the fittings on the end plate to the connections provided at the support structure. The cell stack assemblies are likewise difficult to remove from the support structures.

What is needed is a fuel cell installation for which it is simple to align the cell stack assembly with the support structure and achieve the connections between the electrical and fluid fittings and the connections at the support structure, without having tool access to make these connections.

SUMMARY

A fuel cell installation is disclosed that includes a support structure and a cell stack assembly that is removably insertable into the support structure from an uninstalled position to an installed position during an installation procedure. The cell stack assembly includes a fitting. An interfacing structure is mounted on one of the support structure in the cell stack assembly. The interfacing structure carries a connector that is configured to receive the fitting in interconnected relationship. At least one of the fitting and the connector floats in a plane relative to the support structure during the installation procedure. In operation, the fitting engages the connector when the cell stack assembly is inserted into the support structure. The fitting is repositioned relative to the connector to ensure that the fitting and connector are aligned with one another and connected upon installation.

These and other features of the disclosure can be best understood from the following specification and drawings, the following of which is a brief description.

DETAILED DESCRIPTION

Figure 1:
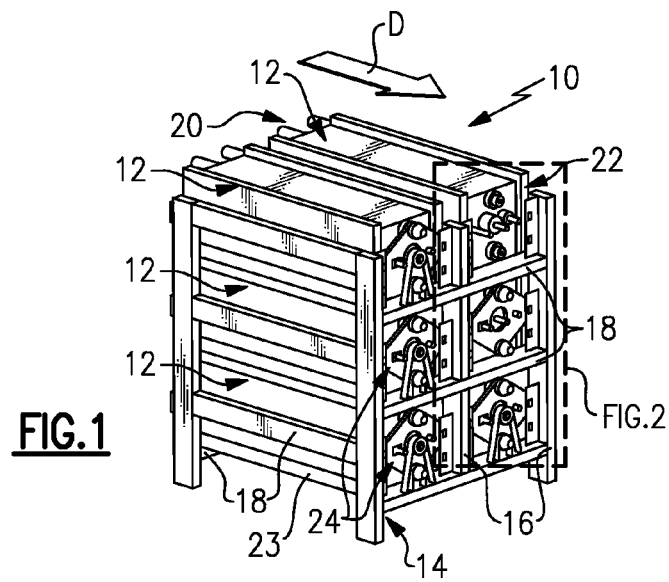
FIG. 1 is a perspective view of a rear of a fuel cell assembly, in accordance with an embodiment of the disclosure.

A fuel cell assembly 10 is shown in FIG. 1. The fuel cell assembly 10 includes multiple cell stack assemblies 12 that are installed into a support structure 14 constructed of a framework of vertical and horizontal members 16, 18, for example. Each cell stack assembly 12 includes opposing front and rear ends 20, 22 that apply a clamping load to fuel cell components, such as anodes, cathodes and membrane electrode assemblies. In one example, the cell stack assembly 12 includes proton exchange membranes and porous plates having internal manifolds, which provide fuel and reactant to fuel and reactant flow fields in the anode and the cathode.

The support structure 14 includes spaced apart support brackets 23, which have an L-shaped cross-section in one example, for slidably receiving and supporting the cell stack assemblies 12. In the example, each cell stack assembly 12 is removably inserted into the support structure 14 in a direction D (z-direction in FIGS. 2 and 4) from an uninstalled position to an installed position during an installation procedure. In one example, the rear end 22 is inserted first into the support structure 14. The rear end 22 includes an end plate 26 having one or more fluid and/or electrical fittings 28, 30. The fluid and electrical fittings 28, 30 are not visible during installation and cannot be easily accessed so that the fluid and electrical fittings 28, 30 must be connected blind to their respective fluid and electrical connectors 50, 48. To ensure alignment and a good sealing connection between the fluid and electrical fittings 28, 30 and the fluid and electrical connectors 50, 48, an interfacing structure 24 is used to align the fittings and connectors while the cell stack assembly 12 is installed into the support structure 14.

In the example, the fittings 28, 30 are male and the connectors 48, 50 are female. Of course, the fittings could be female and the connectors could be male. The female connectors are coaxial with the male fittings and circumscribe or surround them. The connections provided between the male and female fittings and connectors may be of any suitable type, such as bulkhead, push-to-connect, face seal, radial o-ring seal, flat gasket, pressurized seal, or any other connection configuration that is misalignment tolerant.

In one disclosed example, the fuel cell installation includes the support structure 14. The cell stack assembly 12 is removably inserted into the support structure 14 from an uninstalled position where the fittings 28, 30 and connectors 48, 50 are not fully connected (not shown) to an installed position (illustrated in the Figures), during an installation procedure. The cell stack assembly 12 include the fittings 28, 30 in the disclosed example. The interfacing structure 24 is mounted on either the support structure 14 or the cell stack assembly 12. The interfacing structure 24 carries connectors 48, 50 in the disclosed example in an interconnector relationship. At least one of the fittings and the connectors are moveable in a plane (x-y) relative to the support structure 14 during the installation procedure.

Figure 2:
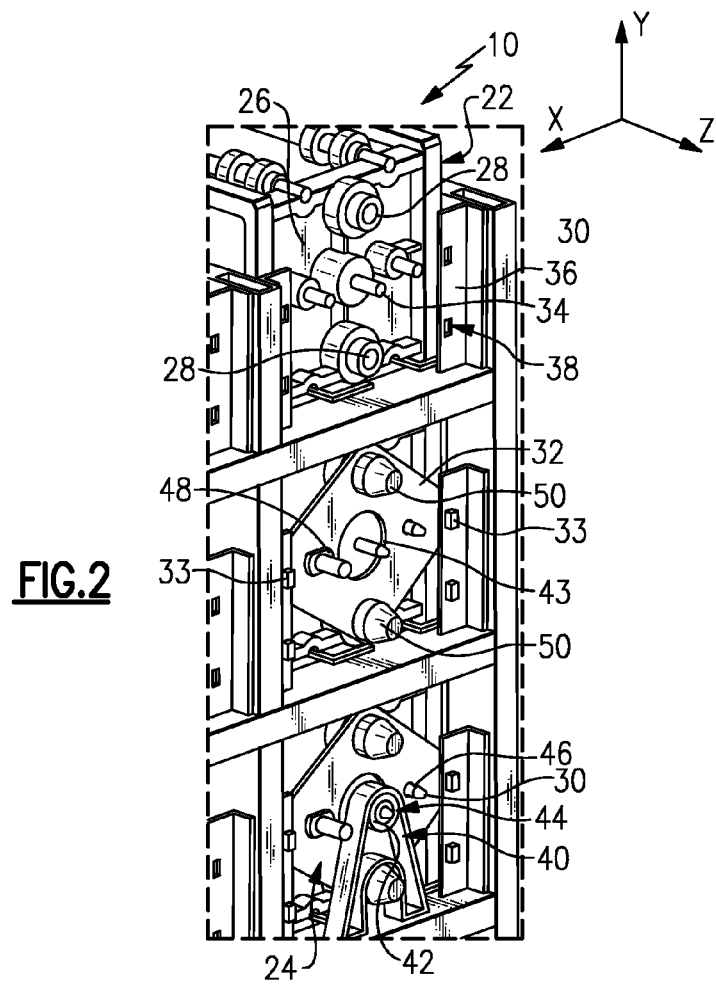
FIG. 2 is an enlarged perspective view of a portion of the fuel cell assembly shown in FIG. 1.

Referring to FIGS. 1 and 2, the interfacing structure 24 includes a plate 32 that floats relative to the support structure 14. FIG. 2 is an enlarged view of the right column of cell stack assemblies. The plate 32 is not shown at the upper right cell stack assembly in FIGS. 1 and 2 for clarity. Some of the supporting structure for the plate 32 is also omitted for clarity from the topmost and middle cell stack assemblies in the right column of cell stack assemblies.

The movable plate 32 enables the cell stack assembly 12 to be aligned with the support structure 14 as the cell stack assembly 12 is slid rearward during installation. Movement of the plate 32 also provides a rough alignment between the fittings and connectors. As shown in FIG. 2, the plate 32 and support structure 14 includes interlocking features provided by flanges 36 and fasteners 33. The flanges 36 include slotted apertures 38 that receive the fasteners 33 secured to the plate 32, which permit limited movement of the plate 32 in an x-y plane.

A mounting bracket 40 is secured to one of the horizontal members 18. The mounting bracket 40 includes an aperture 42 that houses a bearing 44. A pin 34 extends from the end plate 26 and is received by the bearing 44, which carries the weight of the rear end 22 and aligns the end plate 26 relative to the support structure 14 by tilting as needed. The plate 32 includes an opening 43 through which the pin 34 extends. The plate 32 also has openings 46 that accommodate the electrical fittings 30. The rightmost electrical connector 48 is omitted for clarity.

The electrical and fluid connectors 48, 50 are carried by the plate 32 in the example and are permitted to float in the plane of the plate 32, enabling additional movement and alignment between the fittings and connectors during installation. The installation direction z is generally perpendicular to the plane (x-y) of the plate 32 in the examples shown. The fluid and electrical fittings 28, 30 correspondingly engage the fluid and electrical connectors 50, 48 and reposition the electrical and fluid fittings 48, 50 and plate 32, as needed, to more precisely align the fittings and connectors with one another.

Figure 4:
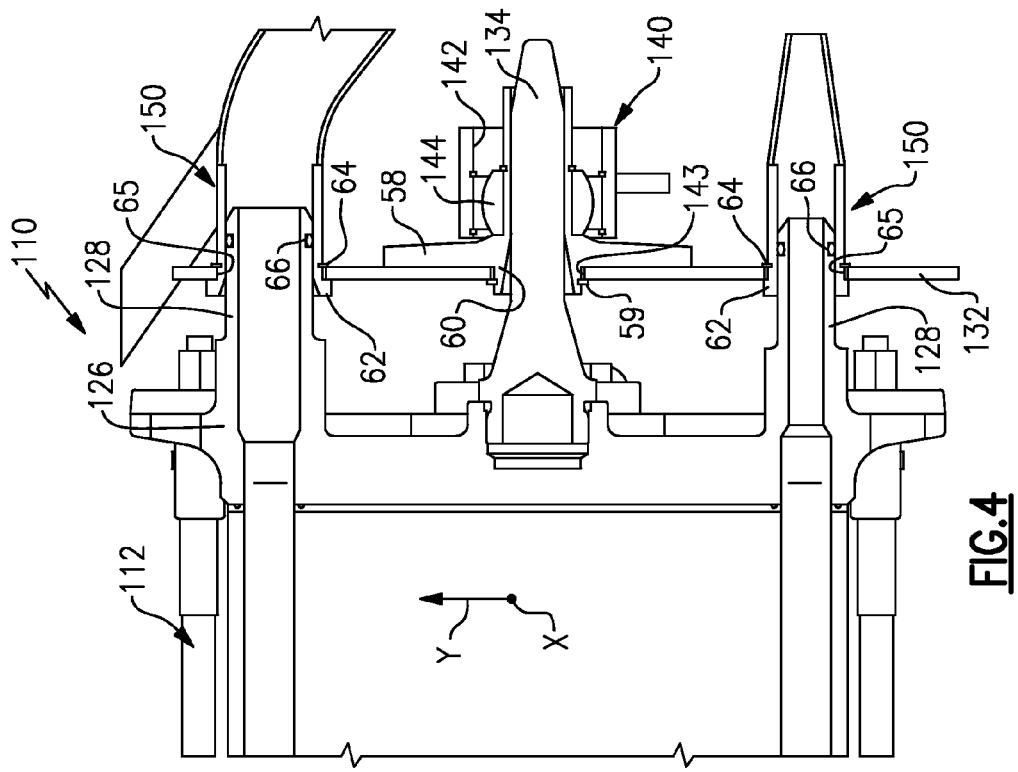
FIG. 4 is a cross-sectional view of the fuel cell assembly shown in FIG. 3 taken along line 4-4.
Figure 3:
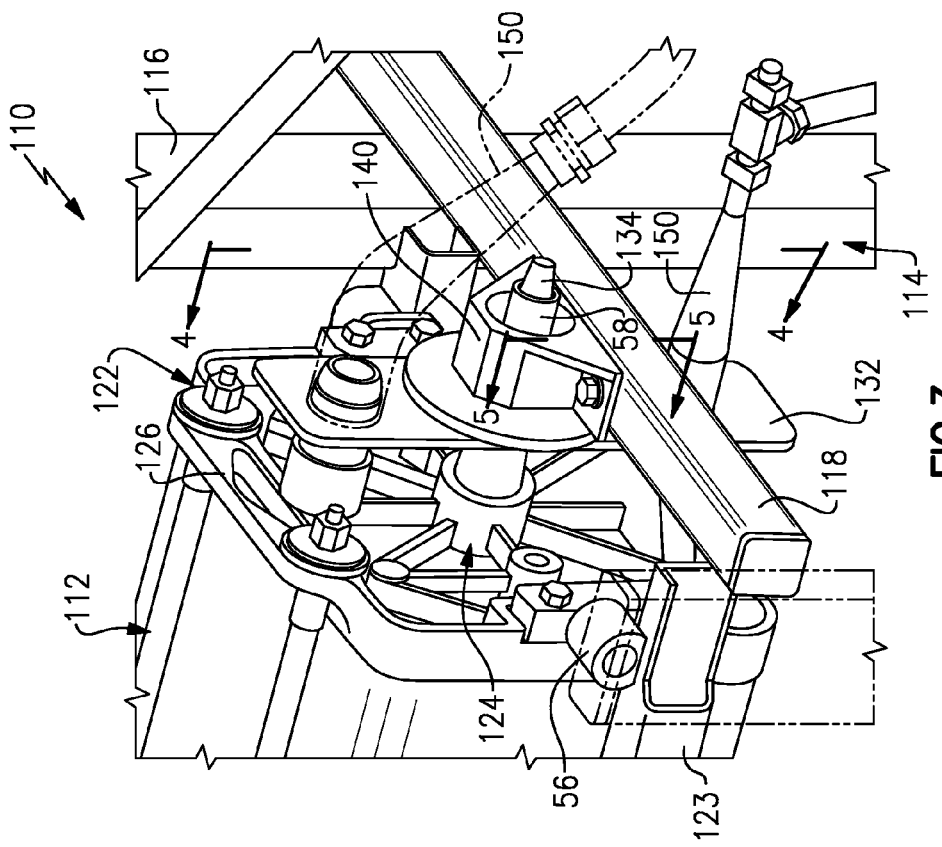
FIG. 3 is an enlarged perspective view of a fuel cell assembly, in accordance with another embodiment of the disclosure.

Another example cell stack assembly 110 is shown in FIGS. 3 and 4. Protrusions 56 extending from either side of the cell stack assemblies 112 are slidable on the support brackets 123. The mounting bracket 140 is supported on the horizontal member 118 (secured between vertical members 116) and houses a spherical bearing 144. A dielectric bushing 58 is secured to the plate 132 in opening 143 with a retainer 59. The bushing 58 includes a tapered opening 60 for receiving a tapered end of the pin 134 during installation.

The plate 132 of the interfacing structure 124 includes apertures 65 that are slightly larger than the outer diameter of the fluid fittings 128, which extend from the rear plate 126 at the rear end 122. The fluid connectors 150 include lip 62 and retainer 64 for axially locating the fluid connections 150 while permitting them to float in the x-y plane during installation to enable alignment of the fluid fittings 128 relative to the fluid connectors 150. In the example, an O-ring 66 is used between the fitting and connectors to seal them relative to one another.

Figure 5:
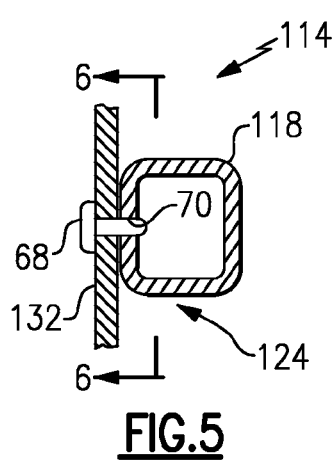
FIG. 5 is a cross-sectional view of a portion of the interfacing structure shown in FIG. 3 taken along line 5-5.
Figure 6:
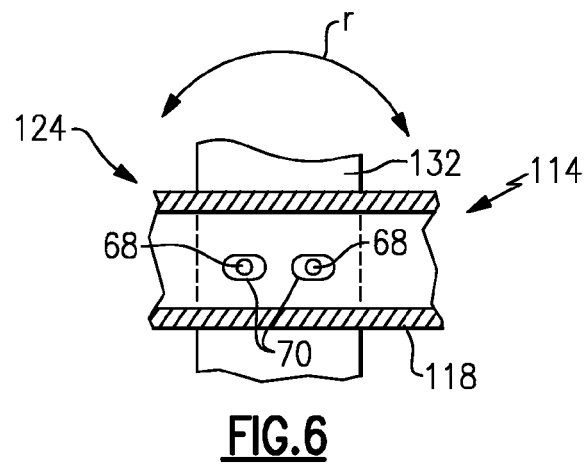
FIG. 6 is a cross-sectional view of the interfacing structure taken along line 6-6 in FIG. 5.

Referring to FIGS. 5 and 6, the plate 132 includes one or more pins 68 having ends that are received in slotted apertures 70 in the horizontal member 118, which provide interlocking features that permit constrained rotation R of the plate 132 relative to the support structure 114 during installation.

Figure 7:
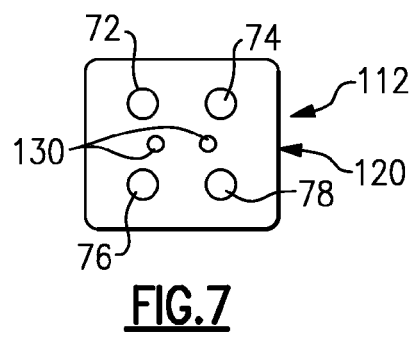
FIG. 7 is a schematic view of a front end of the fuel cell installation shown in FIG. 3.

In the fuel cell installation shown in FIGS. 3 and 4, the fluid fittings 150 provide a coolant inlet and outlet. The connections are made "blind" at the rear end 122 as described above. Fuel inlet and outlet 72, 74 and reactant inlet and outlet 76, 78 are provided at the front end 120 in the example shown, as illustrated in FIG. 7. The connections at the front end 120 can be made using traditional connection techniques, for example, since the fittings and connectors at the front end 120 are not obscured or obstructed.

Although example embodiments have been disclosed, a worker of ordinary skill in this art would recognize that certain modifications would come within the scope of the claims. For that reason, the following claims should be studied to determine their true scope and content.

The invention claimed is:

1. A fuel cell installation comprising:
a support structure;
a cell stack assembly removably insertable into the support structure from an uninstalled position to an installed position during an installation procedure, the cell stack assembly including a fitting; and
a floating plate mounted on one the support structure and the cell stack assembly, the floating plate carrying a connector configured to receive the fitting in an interconnected relationship, the connector movable in a plane relative to the support structure and aligning with the other of the fitting and the connector in response to insertion of the cell stack assembly into the support structure during the installation procedure.

2. A fuel cell installation comprising:
a support structure;
a cell stack assembly removably insertable into the support structure from an uninstalled position to an installed position during an installation procedure, the cell stack assembly including a fitting; and
a floating plate mounted on one the support structure and the cell stack assembly, the floating plate carrying a connector configured to receive the fitting in an interconnected relationship, at least one of the fitting and the connector movable in a plane relative to the support structure and aligning with the other of the fitting and the connector in response to insertion of the cell stack assembly into the support structure during the installation procedure, wherein the floating plate is mounted on the support structure with a bearing arranged between the support structure and floating plate in the installed position.

3. The fuel cell installation according to claim 2, wherein the bearing is a spherical bearing permitting rotation of the floating plate relative to the support structure.

4. The fuel cell installation according to claim 2, wherein the floating plate includes interlocking features between the support structure and the floating plate limiting rotation therebetween.

5. A fuel cell installation comprising:
a support structure;
a cell stack assembly removably insertable into the support structure from an uninstalled position to an installed position during an installation procedure, the cell stack assembly including a fitting; and
an interfacing structure mounted on one the support structure and the cell stack assembly, the interfacing structure carrying a connector configured to receive the fitting in an interconnected relationship, at least one of the fitting and the connector movable in a plane relative to the support structure and aligning with the other of the fitting and the connector in response to insertion of cell stack assembly into the support structure during the installation procedure, wherein the interfacing structure is mounted on the support structure with a bearing arranged between the support structure and interfacing structure in the installed position, wherein the interfacing structure includes a dielectric bushing arranged between the bearing and the cell stack assembly electrically insulating the cell stack assembly relative to the support structure.

6. The fuel cell installation according to claim 5, wherein the interfacing structure includes a tapered pin extending from the cell stack assembly and received by the bushing in the installed position.

7. The fuel cell installation according to claim 2, wherein the connector is captured within an aperture of the plate and movable in a plane relative thereto.

8. The fuel cell installation according to claim 7, wherein the connector is a fluid connector that includes a lip, the lip and a retainer axially locating the fluid connector within the aperture and permitting movement of the fluid connector in the plane.

\* \* \* \* \*